United States Patent

[11] 3,627,736

[72] Inventors Alaric Louis Jeffrey Raum;
Prem Sagar Thukral, both of 2 Castle Precinct, Llandough, Cowbridge, Glamorgan, Wales
[21] Appl. No. 41,556
[22] Filed May 28, 1970
[45] Patented Dec. 14, 1971
Continuation-in-part of application Ser. No. 725,126, Apr. 29, 1968, now abandoned. This application May 28, 1970, Ser. No. 41,556

[54] POLYAMIDES FROM ISOPHORONE DIAMINE, HEXAMETHYLENE DIAMINE, ISOPHTHALIC ACID AND TEREPHTHALIC ACID
4 Claims, No Drawings
[52] U.S. Cl................................................ 260/78 R,
117/132 A, 260/2.5 N, 260/45.7 P, 260/78 A, 264/DIG. 61
[51] Int. Cl....................................................... C08g 20/20

[50] Field of Search............................................ 260/65, 78 R, 78 A

[56] References Cited
UNITED STATES PATENTS

| | | | |
|---|---|---|---|
| 3,294,759 | 12/1966 | Gabler............................ | 260/78 |
| 3,352,834 | 11/1967 | Schmitt et al.................. | 260/78 |
| 3,352,835 | 11/1967 | Schmitt et al.................. | 260/78 |
| 3,352,836 | 11/1967 | Schmitt et al.................. | 260/78 |

Primary Examiner—William H. Short
Assistant Examiner—L. L. Lee
Attorney—Jacobs & Jacobs ABSTRACT: A tough transparent amorphous polyamide based on isophthalic acid, terephthalic acid, hexamethylene diamine to isophorone diamine wherein 5 to 50 moles percent of the diamines are based on isophorone diamine and at least 50 moles percent of the diamines are based on hexamethylene diamine. The polyamide has good impact strength, resistance to boiling water and little tendency to absorb water.

POLYAMIDES FROM ISOPHORONE DIAMINE, HEXAMETHYLENE DIAMINE, ISOPHTHALIC ACID AND TEREPHTHALIC ACID

This invention relates to polyamides and to a process for their preparation and is a continuation in part of our application Ser. No. 725126 filed Apr. 29, 1968, now abandoned.

According to the present invention there is provided a polyamide having acid and amine residues at least 80 moles percent of the total residues being isophthalic acid, terephthalic acid, hexamethylene diamine and isophorone diamine residues, where 5–50 moles percent of the amine residues are isophorone diamine residues and at least 50 moles percent of the amine residues are hexamethylene diamine residues. Isophorone diamine is 3-aminomethyl-3,5,5-trimethylcyclohexylamine and is normally used as a mixture of the cis and trans isomer.

The polyamides of the present invention are tough transparent amorphous polymers which are readily moldable over a wide temperature range. They have good resistance to boiling water and little tendency to absorb water. They also have good mechanical properties and high softening points.

Polyamides having the highest resistance to water have amine residues containing 10–40 moles percent, preferably 15–40 moles percent, of isophorone diamine. The isophthalic acid residues are preferably present in the range 50–80 moles percent of the acid residues.

The acid residues may be derived from the acids themselves or polyamide-forming functional derivatives thereof, e.g. their esters or acid chlorides.

Small amounts of residues of other diamines, dicarboxylic acids, amino-acids or lactams may be present in the polyamides of the present invention in order to produce small variations in the physical properties of the polymers or partially to replace expensive materials with those of a less expensive type. For example residues of aliphatic dicarboxylic acids e.g. adipic acid, trimethyladipic acid, sebacic acid or dodecanedioic acid, and residues of diamines e.g. 1,12-dodecamethylene diamine, 2,4,4-trimethylhexamethylene diamine, 2,2,4-trimethylhexamethylene diamine, meta-xylylene diamine or para-xylylene diamine may be present in the polyamides of the present invention. Residues of amino-acids such as 6-aminocaproic acid or 12-aminododecanoic acid or of lactams such as caprolactam of dodecanolactam may also be present. These additional acid and amine residues may be present provided they have no adverse effect on the properties of the polyamides.

The polyamides of the present invention may be prepared by a process which comprises condensing substantially equimolar proportions of (a) isophthalic acid and terephthalic acid or polyamide forming functional derivatives thereof and (b) hexamethylene diamine and isophorone diamine or polyamide forming functional derivatives thereof wherein 5–50 moles percent of the diamines are derived from isophorone diamine and at least 50 moles percent of the diamines are derived from hexamethylene diamine. They may be prepared by melt polycondensation methods of the acids and diamines or of the "nylon" salts. The condensation temperature may lie in the range 200° to 300° C., preferably in the range 230° to 300° C. The reactants may be progressively heated to a temperature above 200° C. over a period of time during which water and other volatiles are produced. The volatile material may then be removed by distillation and the resulting melt heated for a further period at a temperature between 260° C. and 280° C. until the desired molecular weight polyamide is obtained.

In a particularly preferred method according to the invention, a precondensation step between the acid and the amine and in the presence of water is carried out under reflux conditions, before the polycondensation is carried out. The reflux conditions may be at about 90° to 100° C. at atmospheric pressure or under autogenous pressure in a sealed reactor at a temperature of up to about 250° C. In the precondensation step about 20–150 percent water based on the weight of the reactants may be added.

The polycondensation should always be carried out in the absence of free oxygen and may be carried out under an inert gas for example nitrogen.

The acid reactant and the amine reactant in the process of the present invention condense in equimolar proportions and thus equimolar quantities are required by the process. However, it is often necessary to start with an excess of the diamine reactant to allow for losses which occur during distillation and because of minor side-reactions. It is found that if the pH of the reaction mixture as measured at 60° C. is adjusted to between ph 7.0–7.5 the correct balance of diacid to diamine in the resulting polyamide is achieved. It may be necessary to increase the pH to 8.0 or 8.5 if the efficiency of the fractionating column is such that a larger proportion of the volatile diamine components is lost.

The polyamides of the present invention have high melt viscosities and it is therefore advisable to agitate the reaction mixture by stirring efficiently and continuously to avoid the occurrence of "dead spaces" in the resulting polyamide where reactants have incompletely condensed and thereby upset the molar ratio of the reactants. The use of stainless steel reactors fitted with powerful helical stirrers has been found very suitable for this purpose. Screw reactors, particularly twin-screw reactors, are also extremely effective, especially for the higher molecular weight products. In a preferred method of carrying out the process of the present invention, the polycondensation may be carried out in two or more stages, the reaction being commenced in a conventional stirred reactor or series of stirred reactors and being completed in a screw reactor e.g. a twin shaft hollow screw reactor of the type manufactured by Messrs. Werner & Pfleiderer. This process is particularly suited for adaptation to a continuous process in that as the condensation reaches its final stages the viscosity of the mixture is high and thus as well as efficiently agitating and reacting the melt the screw reactor can be arranged to deliver the required polyamide from the reactor continuously.

Interfering impurities e.g. monobasic acids, monoamines or ammonia which lead to low molecular weight or discolored products should normally be substantially absent from the reaction mixture, although controlled amounts of certain monobasic acids or monoamines can be added with advantage to control the molecular weight of the polymer, if this is required. In order to obtain a colorless polyamide it is necessary to have the reactants as free as possible from color-forming impurities. This may be achieved by the isolation and purification of the salt formed from the diamine and the dicarboxylic acid e.g. by treatment of hot aqueous solutions of the salts with activated charcoal. Precipitation of the salts from aqueous solutions has been found to be best effected by cooling the solution and then mixing the cooled solution with an alcohol such as methanol or isopropanol. The salt may then be isolated by filtration or centrifugation.

Polyamide stabilizers may be added and it is sometimes advantageous to add these to the reaction mixture provided of course they do not interfere with the course of the reaction. Particularly good results have been obtained by the addition of phosphites such as tri(hydrocarbyl) phosphites e.g. triphenyl phosphite, diethyl hexyl phosphite and tris nonylphenyl phosphite. The proprietry compound "Polygard" has been found to be a useful color stabilizer of this type. It is sometimes advantageous to use mixtures of these phosphites and also to incorporate other types of stabilizers which improve the thermal, oxidative or ultraviolet stability of the polymers.

The molecular weights of the polyamide may be controlled to some extent by the known methods for example by altering some or all the following conditions:—molar ratio of diacid to diamine, concentration of monoacid or monoamine, temperature, time of reaction and concentration of reactive impurities. The preferred polyamides have inherent viscosities greater than 0.7 preferably greater than 1.0, where inherent viscosity is determined in Ostwald type viscometers for 0.15 percent by weight solutions in 98 percent sulfuric acid at 25° C. and unless otherwise stated the inherent viscosity values referred to in this specification are determined under these conditions.

The polyamides of the present invention have good mechanical strength, improved resistance to boiling water and satisfactory softening points. They are very suitable for compression moulding, injection moulding, extrusion, blow moulding, vacuum forming, cold forming, soft forming and coating applications. For coating applications especially for metallic objects, the polyamide may be applied as a powder using fluidized bed dip coating, electrostatic deposition and flame-spraying techniques, the object being heated to the temperature necessary to obtain a coherent film. The polyamides may also be utilized in the form of rigid foams. Monofilaments or fibers of good tensile strength may be extruded or cold drawn.

The invention will be further described with reference to the examples that follow In the examples the following abbreviations have been used:
HMD for hexamethylene diamine
IPD for isphorone diamine
TRA for terephthalic acid
IPA for isophthalic acid
AA for adipic acid The softening points quoted in the examples are the Vicat Softening Points determined according to British Standards Specification B.S.2782 Pt. 1 1965, Method 102 D.

Impact strengths were determined by the Charpy method using notched bars by British Standards Method 2782 Pt. 3, 1965, Method 306 E.

Resistance to boiling water was determined by comparing the tensile strength of a standard moulded specimen with that of a similar specimen after immersion in boiling water for 24 hours Water absorption of the polyamides was determined by measuring the uptake of water after immersion of a 2-inch diameter disc by one-eighth inch thick in water at 20°C. for 24 hours.

Percentages of the polyamide components are given on a molar basis.

The pH values quoted throughout this specification refer to the pH measured at 60°C.

EXAMPLE 1 Polyamide: HMD 80% TPA 50% 1 IPD 20% IPA 50%

100 ml. distilled water, 48.5 g. dimethyl isophthalate, 48.5 g. dimethyl terephthalate, 47.1 g. hexamethylene diamine, 20.2 g. isophorone diamine were charged in to a 3-necked round bottom Pyrex flask fitted with a stirrer, nitrogen bleed, and reflux condenser. The temperature was maintained at approximately 90–95°C. for 16 hours. The reaction flask was transferred to a Wood's metal bath and the bath temperature gradually raised to 300°C. and held at 300–320°C. for 5 hours during which time methanol and water distilled off. The melt was then allowed to cool to room temperature under nitrogen. The inherent viscosity of the product was 1.14, the Vicat softening point 163°C., and Charpy impact strength 29.0×10$^6$ ergs/cm.$^2$. The tensile strength was 10,600 p.s.i. (at yield) and after 24 hours in boiling water the tensile strength was 9,700 p.s.i.

EXAMPLE 2 Polyamide HMD 85% IPA 60% 1 IPD 15% TPA 40%

A polycondensation was carried out in a stainless steel reactor fitted with an efficient fractionating column, using the following dry salts: terephthalic acid/hexamethylene diamine (226 g.), isophthalic acid/hexamethylene diamine (254 g.) and isophthalic acid/isophorone diamine (101 g.). The reactor was heated, with stirring, such that the temperature increased to about 200°C. in about 1½ hours, the water of condensation being taken off from the top of the column. The temperature was then held at 200°C. for 3 hours, increased to 270°C. in one-half an hour, and held at about 270°C. for 3 hours, the polymer then being run out of the reactor. This polymer was found to have the following physical properties: inherent viscosity, 0.963; Vicat Softening Point, 150.5°C.; Charpy impact strength 27.0×10$^6$ ergs/cm.$^2$; tensile strength at yield, 12,150 p.s.i., and a tensile strength at break, 9,400 p.s.i. After boiling in water for 24 hours the tensile strength at break was 5,100 p.s.i.

EXAMPLE 3 Polyamide HMD 85% IPA 60% IPD 15% TPA 40%

The following preparation was carried out in a one-half gallon stainless steel reactor. The reaction mixture was: terephthalic acid (266 g.), isophthalic acid (399 g.), 58.1 percent (by weight) aqueous solution of hexamethylene diamine (680 g.), isophorone diamine (102 g.), water (1,000g.), benzoic acid (4.88 g.), triphenyl phosphite (1.1 ml.). Before charging to the reactor, the solution was heated with activated charcoal for 30 minutes, filtered and the pH adjusted to 7.0 at 60°C. by the addition of more isophorone diamine. The reaction was carried out in the usual way, the temperature being maintained at 250–270°C. for about 2½ hours before the polymer was removed from the reactor. The polymer had the following properties: inherent viscosity, 1.066; Vicat Softening Point 152°C.; Charpy impact strength, 28×10$^6$ ergs/cm.$^2$; tensile strength at break, 12,850 p.s.i.; and water absorption 0.67 percent. After boiling in water for 24 hours the tensile strength at break was 9,650 p.s.i.

EXAMPLE 4 Polyamide HMD 85% IPA 60% IPD 15% TPA 40%

The following polycondensation was carried out in a one-half gallon stainless steel reactor fitted with a powerful helical stirrer. The reactor was charged with: isphthalic acid/hexamethylene diamine salt (508 g.), terephthalic acid/hexamethylene diamine salt (452 g.), isophthalic acid/isophorone diamine salt (202 g.), benzoic acid (0.49 g.), triphenyl phosphite (1.1 ml.) and water (500 g.). The temperature was raised to 260°C. over a period of 2½ hours, the water being removed by distillation from the top of the fractionating column. The temperature was held at 260°C for 1½ hours, the column was removed and the temperature increased to 269°C over 1½ hours. The polymer had the following physical properties: inherent viscosity 2.048; Vicat Softening Point, 162°C; and water absorption 0.61 percent.

EXAMPLE 5 Polyamide HMD 85% IPA 60% IPD 15% TPA 40%

A polycondensation was carried out by the method described in example 4, using the following charge: isphthalic acid/hexamethylene diamine salt (508 g.), terephthalic acid/hexamethylene diamine salt (462 g.), isophthalic acid/isophorone diamine salt (202 g.), benzoic acid (4.88 g.), triphenyl phosphite (1.01 ml), and water (500 g.). After removal of the water, the product was heated for 3 hours at 253–265°C. The polymer had the following properties: inherent viscosity 1.053; Vicat Softening Point 154°C.; tensile strength at break 13,150 p.s.i; and a water absorption of 0.65 percent. After boiling point in water for 24 hours the tensile strength was 7,026 p.s.i. at break.

COMPARATIVE EXAMPLES

A series of prior art polyamides were prepared, each having a composition as recommended in either British Pat. Specification 977,868 or 1,096,908:

| EXAMPLE | COMPOSITION (MOLES %) | | | |
|---|---|---|---|---|
| | IPD | HMD | TPA | AA |
| 6 | 50 | — | 10 | 40 |
| 7 | 50 | — | 25 | 25 |
| 8 | 50 | — | 40 | 10 |
| 9 | 31.1 | 18.9 | 15.4 | 34.6 |

Examples 6, 7 and 8 were prepared according to the disclosures in British Pat. Specification 977,868 and Example 9 according to the disclosure in British Pat. Specification 1,096,908. British Pat. Specification 977,868 relates to a process for the preparation of a linear copolyamide which comprises condensing 3-aminomethyl-3,5,5-trimethyl-cyclohexylamine with a mixture of acids comprising adipic acid and an aromatic dicarboxylic acid component comprising terephthalic acid, isophthalic acid or a mixture thereof.

British Pat. Specification 1,096,908 relates to a process for the production of polycondensates which comprises the step of reacting a mixture of 3-aminomethyl-3,5,5-trimethyl-cyclohexylamine and a diamine having the general formula $H_2N \cdot (CHB')_x \cdot NH_2$ where $x$ is from 2 to 10, with one or more dicarboxylic acids or amide forming derivatives thereof. The tensile strength of these polyamides was tested before and after immersion in boiling water for 24 hours and the results compared with those obtained from the polyamides of the present invention are given in the following table. The water absorption and impact strength of the polyamides are also given in the table.

| Ex. No. | Charpy impact strength $\times 10^6$ ergs, cm.$^{-2}$ | Tensile strength (pounds per square inch) | | | | Water absorption (24 hours at 20° C.) percent |
|---|---|---|---|---|---|---|
| | | At yield | | At break | | |
| | | Before boiling | After boiling | Before boiling | After boiling | |
| 1 | 29 | 10,600 | 9,700 | 8,600 | 7,800 | NM |
| 2 | 27 | 12,150 | NM | 9,400 | 5,100 | NM |
| 3 | 28 | NM | NM | 12,850 | 9,650 | 0.67 |
| 4 | NM | NM | NM | NM | NM | 0.61 |
| 5 | NM | NM | NM | 13,150 | 7,026 | 0.65 |
| 6 | 6.3 | (1) | (2) | 13,190 | (2) | 1.9 |
| 7 | NM | 9,800 | 3,730 | NM | NM | 1.7 |
| 8 | Too brittle to test | | | | | |
| 9 | 12.6 | 13,500 | (2) | 8,337 | (2) | 1.5 |

$^1$ Did not yield.
$^2$ Too distorted for measurement.
NOTE.—NM denotes physical property was not measured.

It will be seen from the table that the water absorption properties of examples 3 to 5, the polyamides according to the invention, are 2 or 3 times better than those of examples 6, 7 and 9, the polyamides of the prior art. Furthermore the resistance to boiling water is very satisfactory in the polyamides of examples 1 to 3 and 5 in that the tensile strength is maintained at an acceptable level. A comparison of the Charpy impact strengths clearly demonstrates that the polyamides of the present invention have improved impact strength over those of the prior art.

We claim:

1. A moldable polyamide of diamines and dicarboxylic acids or of diamines, dicarboxylic acids and amino acids wherein the diamines hexamethylene diamine and isophorone diamine and the dicarboxylic acids isophthalic acid and terephthalic acid constitute at least 80 mole percent of the amine and acid content of the polyamide, at least 50 mole percent of the amine content being hexamethylene diamine and from 5 to 50 mole percent of the amine content being isophorone diamine.

2. A polyamide as defined in claim 1 wherein from 10 to 40 mole percent of the amine content of the polyamide is isophorone diamine.

3. A polyamide as defined in claim 1 wherein from 50 to 80 mole percent of the acid content is isophthalic acid.

4. A polyamide as defined in claim 1 wherein 60 mole percent of the acid content is isophthalic acid, 40 mole percent of the acid content is terephthalic acid, 85 mole percent of the amine content is hexamethylene diamine and 15 mole percent of the amine content is isophorone diamine.

* * * * *